United States Patent [19]
Baker et al.

[11] Patent Number: 5,831,762
[45] Date of Patent: *Nov. 3, 1998

[54] IMAGING SENSOR HAVING MULTIPLE FIELDS OF VIEW AND UTILIZING ALL-REFLECTIVE OPTICS

[75] Inventors: George F. Baker, Hesperia; Lacy G. Cook, El Segundo, both of Calif.

[73] Assignee: Raytheon Company, Lexington, Mass.

[*] Notice: This patent issued on a continued prosecution application filed under 37 CFR 1.53(d), and is subject to the twenty year patent term provisions of 35 U.S.C. 154(a)(2).

[21] Appl. No.: 667,577

[22] Filed: Jun. 21, 1996

[51] Int. Cl.$^6$ .......................... G02B 17/00; G02B 21/00; G02B 13/00
[52] U.S. Cl. .......................... 359/353; 359/365; 359/419; 250/353
[58] Field of Search .................................. 359/351, 353, 359/365, 419, 420, 421, 366, 858, 859, 399, 400, 402, 407, 422, 432, 726, 727, 728, 729, 730, 731, 732; 250/353

[56] References Cited

U.S. PATENT DOCUMENTS

| 3,674,334 | 7/1972 | Offner. | |
|---|---|---|---|
| 4,265,510 | 5/1981 | Cook | 359/366 |
| 4,691,999 | 9/1987 | Wheeler | 359/859 |
| 4,751,571 | 6/1988 | Lillquist | 358/113 |
| 4,804,258 | 2/1989 | Kebo | 359/366 |
| 4,834,517 | 5/1989 | Cook | 359/366 |
| 4,877,317 | 10/1989 | Gibbons et al. | 359/421 |
| 5,009,494 | 4/1991 | Iossi et al. | 359/366 |
| 5,136,421 | 8/1992 | Sagan | 359/351 |
| 5,173,801 | 12/1992 | Cook | 359/365 |
| 5,477,395 | 12/1995 | Cook | 359/861 |
| 5,485,306 | 1/1996 | Kiunke et al. | 359/419 |
| 5,661,610 | 8/1997 | Pasternak | 359/859 |

OTHER PUBLICATIONS

R.D. Hudson, Jr. et al., "Infrared Detectors", pp. 162–166, Dowden, Hutchinson, & Ross, Inc., 1975.

F. Donald Brehm, "Diamond Machining of Metal & Plastic Optics", *SPIE vol. 93 Advances in Precision Machining of Optics*, pp. 124–131 (1976).

Eustace L. Dereniak et al., "Optical Radiation Detectors", pp. 186–191, John Wiley and Sons (1984).

Hughes Aircraft Co., Proposal for Airborne Electro-Optical Special Operations Payload (AESOP), EDSG Document No. P120510, pp. 82–84 (1991).

*Primary Examiner*—Thong Nguyen
*Assistant Examiner*—Mark A. Robinson
*Attorney, Agent, or Firm*—Leonard A. Alkov; Glenn H. Lenzen, Jr.

[57] ABSTRACT

An imaging sensor has multiple fields of view of the same scene that may be selected by the user for viewing through mechanical movements. The imaging and selection are accomplished entirely with reflective optical components (mirrors) and without the use of any refractive optical components (lenses). A movable field-shifting mirror selects between a direct view and a modified-of-view image of the scene. The modified-view image is accomplished using a multi-mirror afocal telescope. Additional field-shifting mirrors may be used to select other fields of view and reference sources, as desired, or between various detectors.

16 Claims, 2 Drawing Sheets

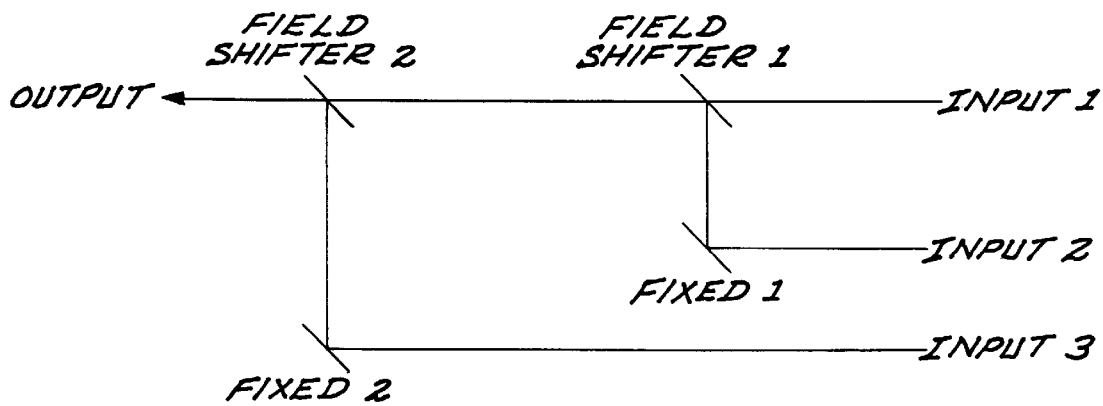
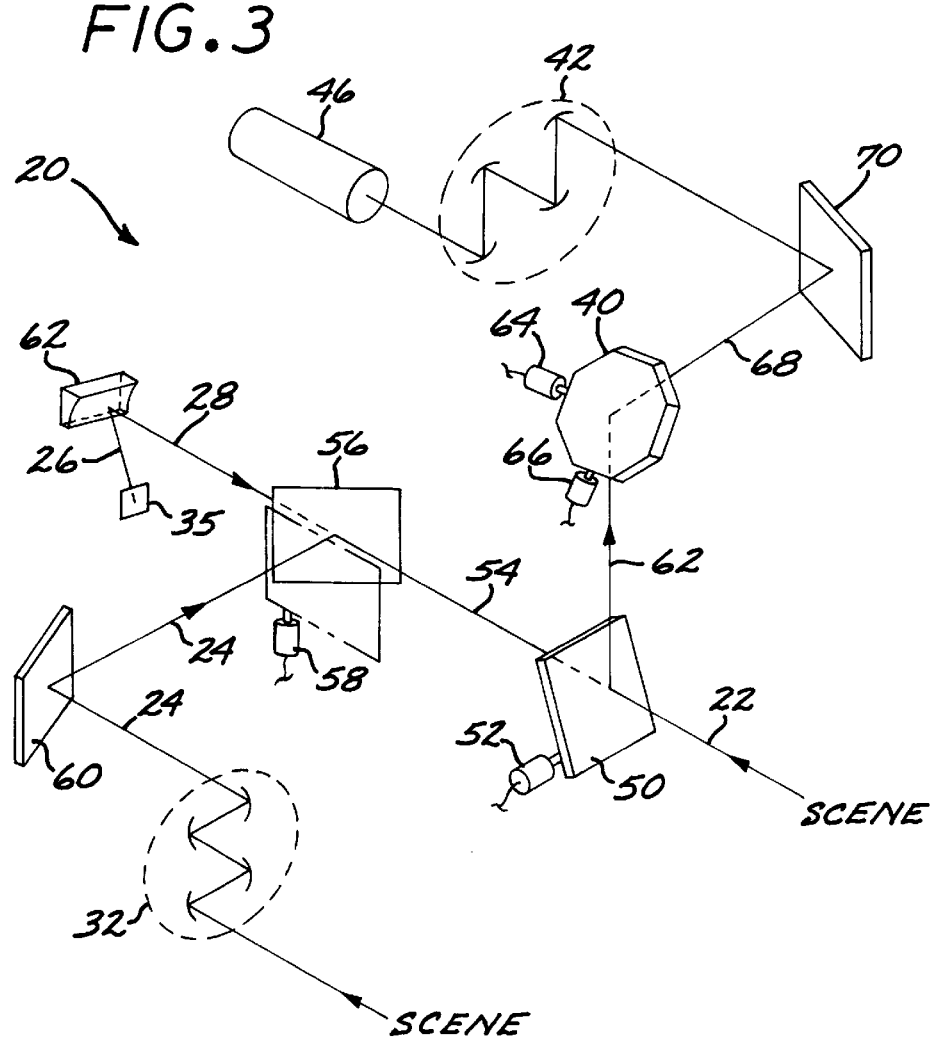

IMAGING SENSOR HAVING MULTIPLE FIELDS OF VIEW AND UTILIZING ALL-REFLECTIVE OPTICS

BACKGROUND OF THE INVENTION

This application relates to an imaging sensor, and, more particularly, to an imaging sensor having readily selectable multiple fields of view of a scene.

Modern tactical aircraft use a number of imaging aids to assist the crew to view a scene, select targets in the scene, and direct weapons against the selected targets. Visible, infrared, and/or narrow-spectrum optical devices are used in various applications to form an image of the scene. The selected imaging spectrum depends upon the mission, weather conditions, the nature of the scene, and other factors.

Regardless of the viewing spectrum, a capability to select the field of view of the scene is desirable. In the present use, "field of view" means the magnification of the scene. That is, a scene may be viewed without magnification or reduction, in an enlarged form in order to better discern small features over a small portion of the scene, or in a reduced form to see a much wider transverse area of the scene. The operation of a multiple field of view (MFOV) sensor would readily select one from among two or more magnification options, one of which is usually the view with no magnification and the others of which may be various magnifications or reductions.

Multiple field of view sensor systems are known for various applications. All known systems suffer from drawbacks that limit their use and effectiveness in various conditions. For example, known MFOV sensors experience relatively high image attenuation in the optical paths. Additionally, their use is limited to a particular wavelength range. For example, although both infrared and visible-light imaging systems are known, the optical system used with an infrared image detector is not generally well suited for use with a visible-light image detector. There must be a physical alteration of the optical system in order to change the detector wavelength range for a different mission, or the aircraft must carry two different optical systems. Simple switching between infrared and visible detectors using a single optical system is not possible. Existing MFOV sensors are somewhat susceptible to aberrations induced by temperature changes, so that great care must be taken to avoid or compensate for such thermally induced aberrations. Lastly, the existing sensors are relatively costly.

There is a need for an improved MFOV imaging sensor that allows the field of view to be readily selected, and also overcomes the limitations of existing MFOV imaging sensors. The present invention fulfills this need, and further provides related advantages.

SUMMARY OF THE INVENTION

The present invention provides a multiple-field-of-view (MFOV) imaging sensor system with reduced attenuation losses and wider optical bandwidth capability than possible with prior MFOV sensor systems. The inventors recognized that the shortcomings of prior MFOV sensor systems are a result, in large part, of the use of refractive optical components (i.e., lenses) in the optical paths. The present MFOV sensor utilizes only reflective optical components (i.e., mirrors) in the optical paths. The high-performance diamond-machined aluminum mirrors used in the preferred embodiments have low attenuation losses. Their thermal expansion is well matched to that of the aluminum structural components, so that thermal expansion aberrations are minimized. The mirrors reflect visible, infrared, and narrow bandwidth light, such as that occurring with laser illumination, so that the optical path may be used with imaging detectors of a wide range of optical bandwidths. Switching between, or simultaneous viewing with, different detectors and viewing optical bandwidths is therefore readily performed. Other refinements such as thermal reference sources are readily incorporated into the system. The reflective optical elements of the present invention are also less costly and more rugged than refractive optical elements, reducing the cost and increasing the robustness of the MFOV imaging sensor of the invention as compared with prior MFOV imaging sensors using refractive optics. The sensor system is an imaging system, meaning that the output of its detector is a two-dimensional image rather than a single scalar value or the like.

In accordance with the invention, a multiple field of view imaging sensor comprises a detector, first means for imaging a scene onto the detector with a first field of view, and second means for imaging the scene onto the detector with a second field of view. The first means comprises a first optical path having at least one reflective component but no refractive component therein, and the second means comprising a second optical path having at least one reflective component but no refractive component therein. There is, additionally, means for selecting between the first means and the second means for imaging onto the detector. As used herein, an "optical path" is a collection of one or more physical optical elements.

More specifically, a multiple field of view imaging sensor comprises a detector, and a detector optical path having an input image and an output image that is imaged onto the detector. The detector optical path has at least one reflective component but no refractive component therein. There is a field-shifting mirror movable between a first position and a second position. The field-shifting mirror has an input in the first position of a view of a scene and an input in the second position of the scene with a modified field of view. The field-shifting mirror has as an output in both the first position and the second position as the input image to the detector optical path. The field-shifting mirror is typically motor driven so as to permit easy and controllable selection of the field to be viewed. A field-modifying optical path has an input image of the scene and an output image of the scene with the modified field of view. The field-modifying optical path includes a telescope with at least one mirror but no refractive component therein. The telescope is preferably a multi-mirror afocal telescope. (A telescope is often thought of as increasing the magnification of a scene. In this usage, however, a telescope may be selected to either increase or reduce the magnification of a scene.) The MFOV imaging sensor may also be provided with one or more additional field-modifying optical paths and/or reference sources. The means for selecting is modified accordingly to allow selection among any one of the optical paths or reference sources. The MFOV imaging sensor may also be provided with one or more additional detectors to permit viewing in a number of wavelength bands, and a second means for selecting the detector to be used.

The present invention provides a MFOV imaging sensor with reduced attenuation and broadband spectral capability. The optical path that provides the image to the detector is formed entirely of reflective optical components and mechanical components. There are no refractive components in the optical path and no electronic components in the optical path. (There may be electronic components indirectly involved to actuate motor drives, but no electronic components are involved with the actual image processing). Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 2 is a ray-path diagram for a field-shifting mirror array for selecting among three available optical inputs, using fixed mirrors and pivoting mirrors that each pivot by 45°; and FIG. 3 is a ray-path diagram of one embodiment of the MFOV imaging sensor.

DETAILED DESCRIPTION OF THE INVENTION

Figure 1:
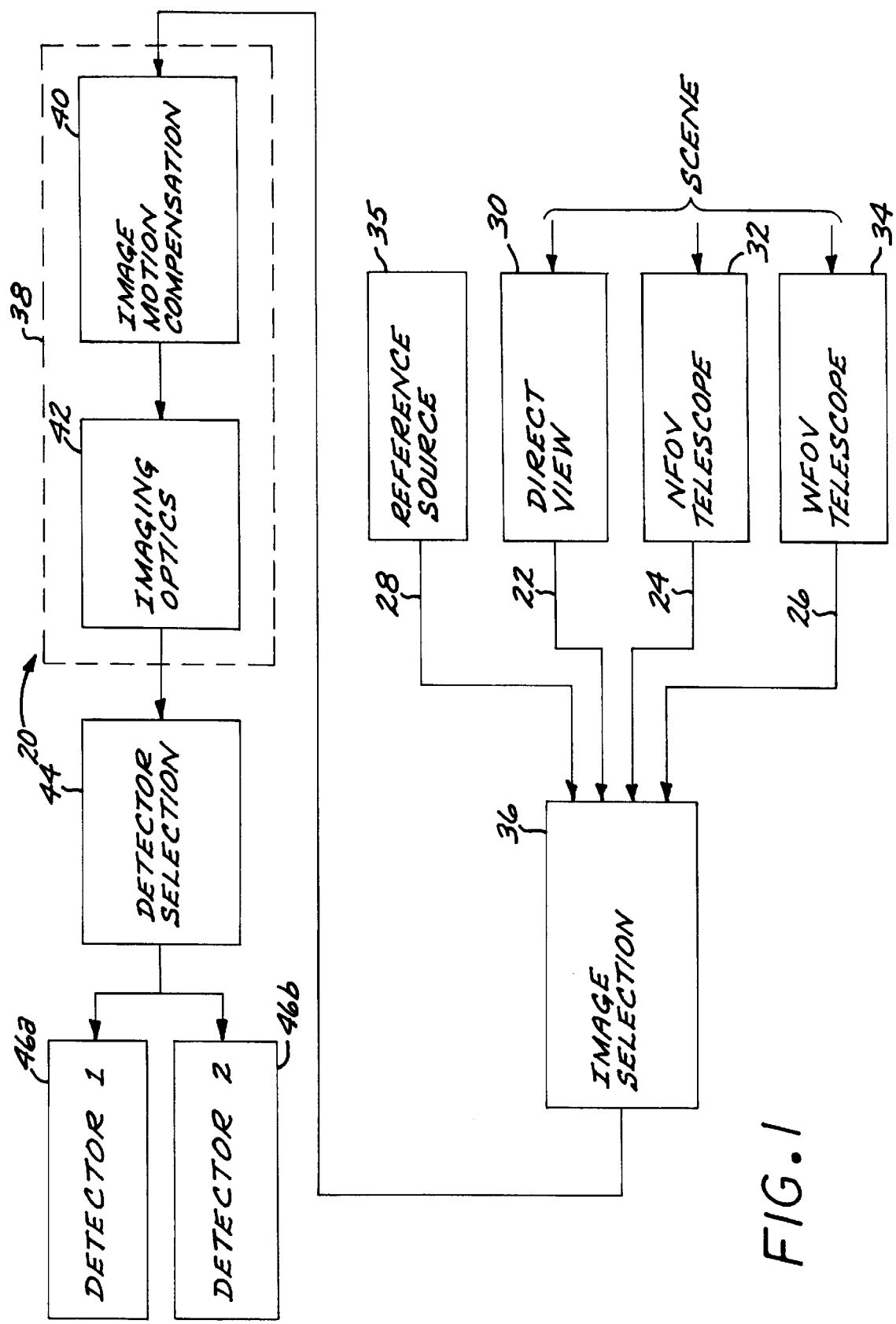
FIG. 1 is a system block diagram of the multiple-field-of-view imaging sensor.

FIG. 1 shows a system block diagram of a multiple-field-of-view (MFOV) imaging sensor 20. The sensor 20 is controllable to provide a direct view 22 of a scene, a narrow field of view (NFOV) 24 of a scene (i.e., increased magnification), or a wide-angle field of view (WFOV) 26 of the scene (i.e., reduced magnification). The sensor 20 may also be controlled to view a reference 28, such as a known temperature standard used to calibrate an infrared detector. In some cases, only one of the modified fields of view (NFOV or WFOV) is required or no reference standard is required. The present invention thus is operable with two or more such fields of view or reference inputs. To view the direct view 22, the scene with no intervening optics (except a protective window) is placed into the optical path, as represented by element 30. To view the narrow field of view 24, the image of the scene is directed through a narrow field of view telescope 32. To view the wide-angle field of view 26, the image of the scene is directed through a wide-angle field of view telescope 34. To image the reference 28, a reference source 35 is provided and imaged.

Multi-mirror afocal telescopes are preferred for use as the telescopes 32 and 34. Such optical components are known in the art for other applications, see, for example, U.S. Pat. Nos. 3,674,334, 4,804,258 and 5,173,801, whose disclosures are incorporated by reference.

The image to be viewed is selected by an image selector 36. The image selector is preferably one or an array of fixed and movable flat mirrors by means of which one of a number of input images may be selected for viewing. FIG. 2 illustrates one form of an array of fixed and movable flat mirrors for selecting between one of three input images. Input 1 is one input to movable field shifter mirror 1. The other input is input 2, which is reflected from fixed mirror 1 so as to lie at 90° to input 1. When field shifter mirror 1 is in its illustrated position, input 2 is reflected from the mirror and directed as one input to field shifter mirror 2. When field shifter mirror 1 is moved out of the path of input 1, input 1 is directed as one input to field shifter mirror 2. Field shifter mirror 2 selects between the output of field shifter mirror 1 and input 3 in a similar manner. The output of the image selector 36 is determined by the positions of the two field shifter mirrors, which are motor driven. In the image selector approach of FIG. 2, the two field shifter mirrors each pivot through a 45° angle. Other types of image selectors may also be used, as where the field shifter mirrors pivot through 90° angles. (The field shifter mirror 50 of FIG. 3 is such a 90° pivoting mirror.) Once the image to be viewed is selected, it is passed through a common detector optics 38. The detector optics preferably includes an image motion compensation (IMC) mirror 40 and imaging optics 42 that focuses the image onto the detector. The IMC mirror 40 is a controllable mirror that is stabilized in a feedback manner by gyroscopes or other stabilizing devices, so that if the imaging sensor 20 moves so that the lateral position of the scene shifts slightly, the IMC mirror 40 moves oppositely to compensate for the relative motion. IMC mirrors are well known in the art, and are described, for example, as a fine Stabilization Assembly (FSA) in Hughes Aircraft Co. EDSG Document P120510, proposal for Airborne Electro-Optical Special Operations Payload (AESOP), pages 82–84 (1991).

The imaging optics 42 is preferably a multi-mirror afocal telescope that focuses the image onto the focal plane of the detector. Such optical components are known in the art for other applications. See, for example, U.S. Pat. Nos. 4,265,510 and 4,834,517, whose disclosures are incorporated by reference.

A detector selector 44 receives the output of the detector optics 38 and uses fixed and optionally movable mirrors to select which of two detectors 46a or 46b is to receive the image. One of the detectors might be an infrared detector and the other a visible-light detector. In such a case, the detector selector 44 may be a spectrally discriminating beam splitter which reflects the visible light and transmits the infrared light. Such beam splitters are known in the art. Each spectral component of the incoming signal is thus directed to its appropriate detector array. Infrared detectors are known in the art and are described, for example, in F. D. Morten et al., "Photoconductive Indium Antimonide Detectors", *Appl. Optics*, vol. 4, no. 6, pages 659–663 (1965), and reprinted at pages 162–166 in R. D. Hudson et al., Infrared Detectors, published by Dowden, Hutchinson & Ross, Inc., 1975. Visible-light detectors are known in the art and are described, for example, at pages 186–191 of E. L. Dereniak et al., Optical Radiation Detectors, published by John Wiley & Sons, Inc., 1984. In some cases, however, only a single detector is used, and the detector selector 44 is not required.

No refractive (lens) optical elements or electronic components are present in any of the components described in relation to FIGS. 1 and 2, except for the detectors 46a and 46b. (There may be ancillary electronic components in the drives of the image motion compensator 40 or the movable mirrors, but these do not perform imaging functions.) All optical path functions are performed by reflective (mirror) optical elements. The use of reflective optical elements rather than refractive optical elements to perform the various imaging functions reduces attenuation of the light beams passing through the optical path. The use of reflective optical elements rather than refractive optical elements also broadens the operable spectral bandwidth of the imaging sensor, inasmuch as the reflective optical elements are operable for both infrared and visible bands, while any set of refractive optical elements is operable for one or the other band, but not both. Mirrors are also generally less costly than lenses.

The reflective optical elements are preferably diamond-machined aluminum mirrors. These mirrors achieve high optical performance with relatively low cost. Aluminum mirrors are more robust than lenses. Their coefficients of thermal expansion are well matched to the optical support structure, generally termed the optical bench, to which the mirrors and other elements are attached. Diamond-machined aluminum mirrors are known in the art for other applications, see, for example, F. Donald Brehm, "Diamond Machining of Metal & Plastic Optics", SPIE Vol. 93 Advances in Precision Machining of Optics, pages 124–131 (1976).

FIG. 3 presents a ray-path drawing of a preferred embodiment of the MFOV imaging sensor 20, illustrating both the components of the optical path and the light ray path through the components. In this embodiment, the detector of the MFOV imaging sensor may controllably and alternately view the direct image, a narrow field (magnified) image, or a reference image. There is no provision for viewing a wide field image in this device, but that additional capability or other additional capabilities may be readily added using the principles discussed in relation to FIGS. 1 and 2.

In the approach of FIG. 3, as in that of FIG. 1, no refractive elements are used. Only reflective elements are present in the optical path. (As used herein, an "optical path" is a collection of one or more optical elements.) The optical path utilizes only optical components and mechanical components such as mounts and motors to move the mirrors that are movable. No electronic components are used in the optical path prior to the detector, which is optoelectronic in nature, except possibly incidentally in motor drives. In FIG. 3, elements corresponding to those already described in relation to FIG. 1 are assigned the same reference numerals.

A direct view image 22 of the scene is provided as an input to a first field-shifting mirror 50, which is pivotable through 90° by a remotely controlled motor 52. In the view of FIG. 3, the first field-shifting mirror is depicted as reflecting the direct view image 22 to the detector. However, a second input 54 to the first field-shifting mirror 50 is provided as an output from a second field-shifting mirror 56, which is pivotable through 45° by a motor 58.

There are two inputs to the second field-shifting mirror 56, one of which is selected as the output 54 by the position of the mirror 56. One of the inputs is the narrow-field-of-view image 24 and the other is the reference image 28. The narrow-field-of-view image 24 is produced when the image of the scene is enlarged (magnified) by the NFOV afocal telescope 32, which is depicted as a set of four curved mirrors as described previously. The output of the telescope 32 is supplied to a fixed flat mirror 60, which reflects the wide field of view image 24 toward the second field-shifting mirror 56. The reference image 28 is provided from a reference source, preferably the thermal reference source 35 that provides a known thermal reference for the calibration of an infrared detector. Such thermal reference sources 35 are known and are available commercially from Thermotrex as the model 03601-9G21-18H. The image of the thermal reference source is reflected by a mirror 62 to the second field-shifting mirror 56.

Acting in cooperation, the two field-shifting mirrors 50 and 56 are used to select one of the direct image, the NFOV image, and the thermal reference image for viewing by the detector 46. The selected image is provided as an output 62 of the first field-shifting mirror 50. The selected image is reflected from the image motion compensation mirror 40, which is driven by motors 64 and 66 so as to compensate for any relative lateral motion between the sensor 20 and the scene. The motion-compensated output 68 of the mirror 40 is reflected from a fixed planar mirror 70 to the imaging optics 42. The imaging optics 42, depicted as four curved mirrors as discussed previously, focuses the selected image onto the focal plane of the imaging detector 46.

In the preferred apparatus of FIG. 3, only one detector 46 is provided, so no detector selector 44 is used in this embodiment. The detector 46 in this case is an infrared detector, necessitating the use of the reference source 35 for calibration purposes.

Those skilled in the art will recognize that the order in the optical path of some of the components may be varied in any of the embodiments such as those of FIGS. 1 or 3. For example, the NFOV telescope 32 could be positioned after the mirror 60. The particular arrangement of components shown in the preferred embodiment of FIG. 3 was selected in part for compactness. A working prototype of the MFOV imaging sensor as shown in FIG. 3 was constructed to fit within a 12-inch diameter sphere by careful arrangement of the optical elements following the principles illustrated in FIG. 3. This working prototype had a 1×direct field of view of 30 by 40 degrees and a 6×magnified narrow field of view of 5.0 by 6.67 degrees, with less than 2 percent distortion in both fields of view. The detector 46 was a 480 by 640 pixel indium antimonide detector with 20 micrometer pixels. The focal length of the 1×direct field of view was 0.692 inches, and the focal length of the 6×narrow field of view was 4.33 inches.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A multiple field of view imaging sensor having a detector, comprising:

first means for imaging a scene onto the detector with a first field of view, the first means comprising a first optical path having at least one reflective component but no refractive component therein;

second means for imaging the scene onto the detector with a second field of view; the second means comprising a second optical path having at least one reflective component but no refractive component therein; and means including one or more flat moveable reflective components for selecting between first means and the second means by alternately routing light from the scene; to either the first first means or the second means first to the second means.

2. The imaging sensor of claim 1, further including third means for imaging the scene onto the detector with a third field of view: the third means comprising a third optical path having at least one reflective component but no refractive component therein, and wherein the means for selecting is operable to select between the first means, the second means, and the third means by alternately routing light from the scene to either the first means, the second means or the third means.

3. The imaging sensor of claim 1, wherein the imaging sensor further includes a reference source; and fourth means for imaging the reference source onto the detector; the fourth means comprising a fourth optical path having at least one reflective component but no refractive component therein, and wherein the means for selecting is operable to select between the first means, the second means, and the fourth means by alternately routing the optical path to either the first means, the second means or the fourth means.

4. The imaging sensor of claim 1, wherein the detector is an infrared detector, and wherein the imaging sensor further includes a thermal reference source; and fourth means for imaging the thermal reference source onto the detector; the fourth means comprising a fourth optical path having at least one reflective component but no refractive component therein and wherein the means for selecting is operable to select between the first means, the second means, and the fourth means.

5. The imaging sensor of claim 1, further including a second detector, and means for selecting between the first detector and the second detector for receiving an output of the means for selecting.

6. A multiple field of view imaging sensor, comprising:

a detector;

a detector optical path having an input image and an output image that is imaged onto the detector, the detector optical path having at least one reflective component but no refractive component therein;

a field-modifying optical path having an input image of the scene and an output image of the scene with a modified field of view, the field-modifying optical path including a telescope with at least one mirror but no retractive component therein; and a field-shifting flat mirror movable between a first position and a second position, the mirror having an input in the first position of a scene with a first field of view and an input in the second position of the scene through the field-modifying optical path with the modified field of view, the field-shifting mirror having as an output in both the first position and the second position the input image to the detector optical path.

7. The imaging sensor of claim 6, wherein the detector optical path comprises an image motion compensation mirror, and at least one mirror.

8. The imaging sensor of claim 6, further including a motor drive connected to the field-shifting mirror to controllably move the field-shifting mirror between the first position and the second position.

9. The imaging sensor of claim 6, wherein the field-modifying optical path comprises a multi-mirror afocal telescope.

10. The imaging sensor of claim 6, wherein the imaging sensor further includes a reference source; and means for imaging the reference source onto the detector, the means for imaging comprising an optical path having at least one reflective component but no refractive component therein.

11. The imaging sensor of claim 10, wherein the detector is an infrared detector and the reference source is a thermal reference source.

12. A multiple field of view imaging sensor, comprising:

a detector;

a detector optical path having an input image and an output image that is imaged onto the detector, the detector optical path having at least one mirror but no refractive component therein, comprising an image motion compensation mirror that receives the input image, a fixed fold mirror that receives as an input the output of the image motion compensation mirror, and an imager optics having at least one reflective mirror, the output of the image optics being the output image;

a field-shifting mirror movable between a first position and a second position, the mirror having an input in the first position of a scene and an input in the second position, the mirror having as an output in both the first position and the second position the input image to the detector optical path; and a field-modifying optical path having an input image of the scene and an output image of the scene with a modified field of view, the field-modifying optical path comprising a multi-mirror afocal telescope with at least one mirror but no refractive component therein, and a fixed mirror that receives as an input the output of the multi-mirror afocal telescope;

an optical input selected from the group consisting of an output of a reference source and an output of a second field-modifying optical path; and a second field-shifting mirror movable between a first position and a second position, the mirror having an input in the first position of the scene with a modified field of view from the field-modifying optical path and an input in the second position of the optical input, the mirror having as an output in both the first position and the second position the input in the second position of the field-shifting mirror.

13. The imaging sensor of claim 12, wherein the reference source comprises a thermal reference source.

14. The imaging sensor of claim 12, wherein the second field-modifying optical path comprises:

a second multi-mirror afocal telescope with at least one mirror but no refractive component therein, and a second fixed mirror that receives as an input the output of the second multi-mirror afocal telescope.

15. The imaging sensor of claim 12, wherein the detector is an infrared detector.

16. The imaging sensor of claim 12, further including a motor drive connected to the field-shifting mirror to controllably move the field-shifting mirror between the first position and the second position.

* * * * *